Oct. 13, 1931. V. HUGHES 1,827,234
RUBBER SPRING SHACKLE AND METHOD OF PRODUCING THE SAME
Filed June 18, 1928
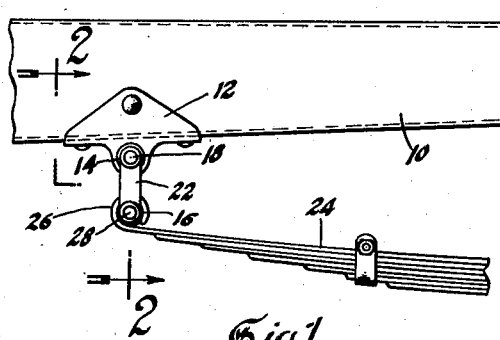
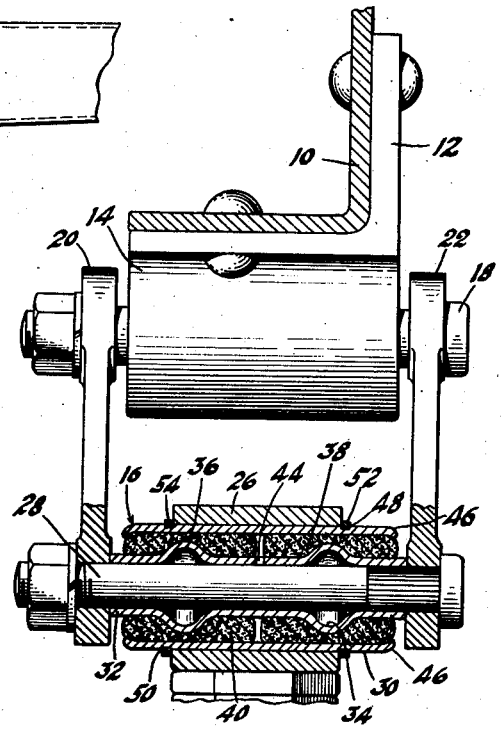
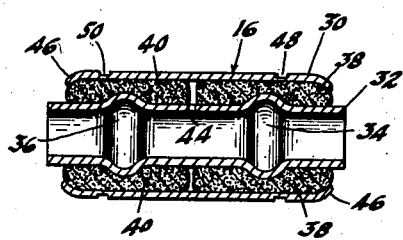
Inventor
Victor Hughes
By Blackmore, Spencer & Hiah
Attorneys Patented Oct. 13, 1931

1,827,234

UNITED STATES PATENT OFFICE

VICTOR HUGHES, OF DETROIT, MICHIGAN, ASSIGNOR TO GENERAL MOTORS RESEARCH CORPORATION, OF DETROIT, MICHIGAN, A CORPORATION OF DELAWARE

RUBBER SPRING SHACKLE AND METHOD OF PRODUCING THE SAME

Application filed June 18, 1928. Serial No. 286,282.

This invention relates to joints and has especial reference to the type of joint used on spring shackles of automotive vehicles.

The joint is of a type using rubber under compression to make a noiseless and oilless connection between the chassis frame and the spring. The joint of the present invention is an improvement over that shown in by prior application Serial Number 219,721, filed September 15, 1927. In the joint shown in the prior application a single cylinder or block of rubber is placed between the central core cylinder and the outer shell. The outer shell is swedged onto the rubber and inner core and in performing this swedging operation the rubber at the center of the cylinder will not spread or flow with the same facility that it does at the ends of the joint or core. This inequality of the spread in the rubber has resulted in a compression in the rubber at the center which is considerably in excess of the compression at the ends of the joint. This inequality in pressure has produced some sidesway in the vehicle to which the joint has been applied.

In the present invention this sidesway is eliminated by using two cylinders of rubber placed toward the end of the core member and when the swedging operation is performed the rubber will flow or spread from both ends of the two rubber cylinders to give a substantially equal compression distribution of the rubber between the core and shell. The flow of the two inner ends of the cylinders of rubber will also substantially fill the space at the center.

In order to allow for the egress of the air at the center of the joint between the ends of the rubber blocks a small opening may be provided in either the core or shell.

The core member is also provided with a plurality of ribs one of which conforms to each cylinder or rubber.

On the drawings:

Figure 1 shows a side view of a portion of the chassis frame of an automotive vehicle showing the manner of applying the invention.

Figure 2 is a section on the line 2—2 of Figure 1.

Figure 3 is a sectional view through the joint showing the various members in assembled relation prior to the swedging operation.

Figure 4 is a view similar to Figure 3 after the swedging operation has been completed.

Referring to the drawings, the numeral 10 designates the chassis frame of the automotive vehicle and 12 a support or bracket secured thereto. Integral with the bracket 12 is the eye 14 within which there is positioned one of the joints 16 of the present invention. Extending through the joint is a bolt 18 on the extended ends of which there are mounted the shackle arms 20 and 22. On the lower ends of the shackle arms there is mounted one end of the spring 24 the upper leaf of which terminates in an eye 26 in which there is positioned a second joint member 16, as is shown in Figure 2. Extending through openings in the ends of the shackle arms 20 and 22 and through the core member 32 of the joint 16 is a bolt 28 which rigidly holds the parts together.

The joint of the present invention is shown in Figures 3 and 4 separated from the spring shackle. The joint comprises the outer shell member 30 and the inner core member 32 both of which are cylindrical in form. The core 32 is preferably provided with two ribs 34 and 36 positioned inwardly on its ends and over these ribs there are applied the rubber cylinders 38 and 40. The ribs are to prevent any possible shifting of the rubber after the swedging operation has been performed. After the rubber cylinders have been applied to the core 32 the shell 30 is assembled thereover as shown in Figure 3. The assembly is then forced through a die and swedged as is disclosed in my prior application. The completed product then appears as is shown in Figure 4 in which it will be noted that the rubber cylinders 38 and 40 have been caused to flow or to spread at their ends and to assume the position shown in Figure 4. From an examination of Figures 3 and 4 it will be apparent that each block or cylinder 38 or 40 will spread or flow in two directions and will take up substantially all of the space between the core 32 and shell 30, giving a substantially even distribution and compression of the rubber in the joint.

By referring to Figure 3 it will be noted that a space 42 exists between the ends of the blocks 38 and 40 in the original assembled relation. When the swedging operation takes place the air confined in the space 42 will be allowed to escape through an opening 44 and the core 32. If desired this opening may be placed in the shell 30.

The ends of the shell 30 are preferably inwardly turned as shown at 46 to aid in assembling the structure and to closer confine the rubber cylinders 38 or 40 at the ends.

Annular grooves 48 and 50 are formed in the shell 30 after the joint has been completed. These grooves are for the reception of rings 52 and 54 which are positioned at opposite sides of the spring eye 26 to hold it at the center of the joint 16.

From the construction as given it will be apparent that a joint has been provided in which the rubber is under compression and there is obtained a substantially equal compression at all parts of the joint. With prior joints in which but a single block of rubber has been used it has been found that some sidesway has been caused in the automotive vehicle due to the variation in the compression of the rubber. In the present invention this sway is eliminated due to the equality in compression and there is also accomplished a decrease in the cost due to the fact that less rubber is required and the structure is easier assembled.

The invention is also of advantage in the making of rather long joints such as shown in the drawings. With the prior constructions in which the single block of rubber is used, some difficulty has been experienced in obtaining a satisfactory joint in which the rubber flowed or spread properly, due to the length of the joint. This objection is not present in the present invention due to the fact that smaller blocks of rubber are used and space is provided between the blocks to permit of a ready flow and an equal compression of the rubber.

I claim:

1. In a joint, a core member, a plurality of resilient elements placed over said core in spaced relation, and an outer shell over said elements and swedged thereon to cause said elements to flow and fill substantially all the space between the shell and core.

2. The structure of claim 1, said joint having an opening to allow for the escape of air from between said elements when being spread or caused to flow to fill up the space between the shell and core.

3. The structure of claim 1, said core having a rib conforming to each element.

4. The structure of claim 1, said elements comprising cylinders of rubber.

5. The structure of claim 1, said elements comprising rubber cylinders, and said core having a rib for each cylinder.

6. The structure of claim 1, said core being longer than said shell and said shell having turned in edge portions.

7. In a spring shackle joint, a pair of shackle arms, a pair of joints between said arms, one of said joints attached to a support and the other attached to a spring eye, each of said joints comprising a hollow cylindrical core member for the reception of a bolt, a plurality of ribs on said core, a plurality of cylinder of rubber over said core, one cylinder at each rib, and an outer shell swedged onto said rubber cylinders to cause the rubber to flow or spread and substantially fill the space between said core and shell.

8. In a joint, a core member, an outer shell, and a plurality of resilient elements under compression between said core and shell, said shell swedged onto said elements to cause them to spread and take up substantially all the space between the core and shell.

9. The method of making a joint consisting in placing a plurality of resilient elements over a core, placing a shell over said elements, and then swedging said shell to cause said elements to spread in the space between said core and shell.

10. The method of making a joint consisting in placing a plurality of resilient elements in spaced relation on a core, placing a shell over said spaced elements, and then swedging said shell to cause said elements to spread or flow and fill substantially all of the space therebetween.

11. The method of making a joint consisting in placing a plurality of rubber cylinders over a central member, placing a shell over said cylinders, and then swedging said shell to final position to cause said rubber to spread or flow into the space between said member and shell.

12. The method of making a joint consisting in assembling a plurality of rubber elements over a central hollow core, placing a shell over said elements, and then swedging the shell over the elements to cause them to spread or flow into the space between the core and shell.

13. The method of making a joint consisting in assembling a plurality of rubber blocks over a central hollow core, placing a hollow shell over said cylinder, and then swedging the shell into place to cause said rubber to flow or spread into the space between said shell and core.

In testimony whereof I affix my signature.

VICTOR HUGHES.